US008386249B2

(12) United States Patent
Fousek et al.

(10) Patent No.: US 8,386,249 B2
(45) Date of Patent: Feb. 26, 2013

(54) COMPRESSING FEATURE SPACE TRANSFORMS

(75) Inventors: Petr Fousek, Litomerice (CZ); Vaibhava Goel, Chappaqua, NY (US); Etienne Marcheret, White Plains, NY (US); Peder Andreas Olsen, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 12/636,033

(22) Filed: Dec. 11, 2009

(65) Prior Publication Data

US 2011/0144991 A1 Jun. 16, 2011

(51) Int. Cl.
*G10L 15/06* (2006.01)

(52) U.S. Cl. ........................................................ 704/243

(58) Field of Classification Search .................. 704/243
See application file for complete search history.

(56) References Cited

U.S. PATENT DOCUMENTS

| | | | | |
|---|---|---|---|---|
| 5,940,795 | A | 8/1999 | Matsumoto | |
| 6,009,390 | A | 12/1999 | Gupta et al. | |
| 6,256,607 | B1 * | 7/2001 | Digalakis et al. | 704/222 |
| 6,892,193 | B2 * | 5/2005 | Bolle et al. | 706/20 |
| 2003/0139926 | A1 | 7/2003 | Jia et al. | |

OTHER PUBLICATIONS

D. Povey et al., "FMPE: Discriminatively Trained Features for Speech Recognition," IEEE ICASSP, Mar. 2005, pp. 961-964, vol. 1.
Daniel Povey, "Improvements to fMPE for Discriminative Training of Features," Interspeech, Sep. 2005, pp. 2977-2980, Lisbon, Portugal.
E. Marcheret et al., "Compacting Discriminative Feature Space Transforms for Embedded Devices," Interspeech, Sep. 2009, 4 pages.
R.A. Gopinath, "Maximum Likelihood Modeling with Gaussian Distributions for Classification," IEEE ICASSP, May 1998, pp. 661-664.
Search Report for PCT/US2010/039631 dated Sep. 1, 2010.

* cited by examiner

*Primary Examiner* — Susan McFadden
(74) *Attorney, Agent, or Firm* — Anne V. Dougherty; Ryan, Mason & Lewis, LLP

(57) ABSTRACT

Methods for compressing a transform associated with a feature space are presented. For example, a method for compressing a transform associated with a feature space includes obtaining the transform including a plurality of transform parameters, assigning each of a plurality of quantization levels for the plurality of transform parameters to one of a plurality of quantization values, and assigning each of the plurality of transform parameters to one of the plurality of quantization values to which one of the plurality of quantization levels is assigned. One or more of obtaining the transform, assigning of each of the plurality of quantization levels, and assigning of each of the transform parameters are implemented as instruction code executed on a processor device. Further, a Viterbi algorithm may be employed for use in non-uniform level/value assignments.

26 Claims, 2 Drawing Sheets

COMPRESSING FEATURE SPACE TRANSFORMS

FIELD OF THE INVENTION

The present invention relates generally to quantization and compression of linear transforms and, more particularly, to compressing a feature space transform discriminatively trained using a minimum phone error objective function.

BACKGROUND OF THE INVENTION

Automatic speech recognition (ASR) systems have found widespread usage in a host of different and varied applications. Some example applications include, but are not limited to, telephony, data entry, transcription, and machine control. Some ASR systems are implemented in other systems (and generally referred to as embedded devices) such as appliances and vehicles.

It is known, however, that an ASR system performs more accurately when it is trained on data associated with, or representative of, the application in which it will operate. Various techniques have been proposed to improve the ASR training process, and thus the real-time (test) usage of the ASR system. One technique is generally referred to as feature space transformation where the feature space that is generated by extraction of cepstral features from the input speech signal is transformed in some manner in order to improve the overall operation of the ASR system. One such feature space transformation technique is known as fMPE (described in further detail below) which provides for discriminative training of the feature space for an ASR system using a minimum phone error (MPE) objective function. The result of the fMPE process is a transform parameter space that can be relatively large and, thus, may present a challenge for ASR systems implemented as embedded devices which may have limited processor and memory capacities.

SUMMARY OF THE INVENTION

Principles of the invention provide, for example, methods for compressing a transform associated with a feature space. While the principles of the invention illustratively described herein are particularly suitable to ASR systems and feature space transformation related thereto, the inventive compression techniques are not so limited and thus may be applied to various other linear transforms.

In accordance with a first aspect of the invention, a method for compressing a transform associated with a feature space comprises obtaining the transform comprising a plurality of transform parameters, assigning each of a plurality of quantization levels for the plurality of transform parameters to one of a plurality of quantization values, and assigning each of the plurality of transform parameters to one of the plurality of quantization values to which one of the plurality of quantization levels is assigned. One or more of obtaining the transform, assigning of each of the plurality of quantization levels, and assigning of each of the transform parameters are implemented as instruction code executed on a processor device.

In accordance with a second aspect of the invention, a system for compressing a transform associated with a feature space is provided. The system comprises modules for implementing the above method.

In accordance with a third aspect of the invention, apparatus for compressing a transform associated with a feature space is provided. The apparatus includes a memory and a processor coupled to the memory. The apparatus is configured to perform the above method.

In accordance with a fourth aspect of the invention, an article of manufacture for compressing a transform associated with a feature space is provided. The article of manufacture is tangibly embodying a computer readable program code which, when executed, causes the computer to carry out the above method.

In accordance with a fifth aspect of the invention, a method of automatic speech recognition comprises transforming training-speech data to a transform in a feature space. The transform comprises a plurality of transform parameters. The method further comprises assigning each of a plurality of quantization levels for the plurality of transform parameters to one of a plurality of quantization values, and assigning each of the plurality of transform parameters to one of the plurality of quantization values to which one of the plurality of quantization levels is assigned. One or more of obtaining the transform, assigning of each of the plurality of quantization levels, and assigning of each of the transform parameters are implemented as instruction code executed on a processor device. Further, a Viterbi algorithm may be employed for use in non-uniform level/value assignments.

Advantageously, principles of the invention provide, for example, a reduction by up to approximately 95% to 98% in the amount of memory required for automatic speech recognition, without substantially degrading accuracy of speech recognition.

These and other features, objects and advantages of the present invention will become apparent from the following detailed description of illustrative embodiments thereof, which is to be read in connection with the accompanying drawings.

DETAILED DESCRIPTION OF THE INVENTION

Figure 1:
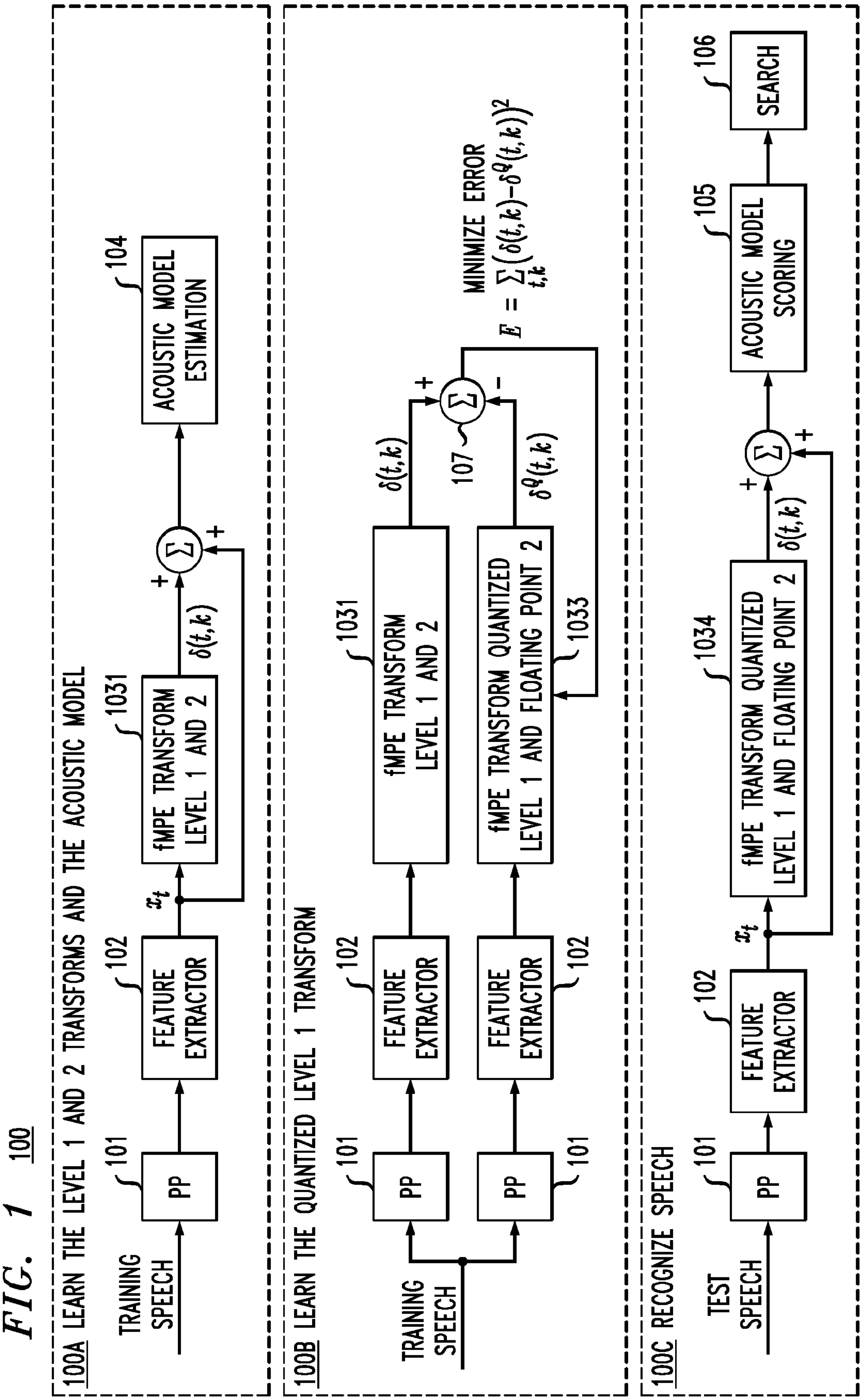
FIG. 1 shows a block diagram of an automatic speech recognition system according to an exemplary embodiment of the invention.

Principles of the present invention will be described herein in the context of illustrative methods for automated speech recognition. It is to be appreciated, however, that the principles of the present invention are not limited to the specific methods and devices illustratively shown and described herein. Rather, the principles of the invention are directed broadly to techniques for quantization of general linear transforms. For this reason, numerous modifications can be made to the embodiments shown that are within the scope of the present invention. That is, no limitations with respect to the specific embodiments described herein are intended or should be inferred.

As illustratively used herein, quantization in the context of signal processing is the process of mapping or approximating a very large set of values, or a continuous range of values, by a relatively small, set of symbols or values.

As illustratively used herein, a phone is an individual sound unit of speech without concern as to whether or not it is a phoneme of some language.

As illustratively used herein, a hidden Markov model (HMM) is a statistical model in which the system being modeled is assumed to be a Markov process with an unobserved state. An HMM may be considered, for example, as the simplest dynamic Bayesian network. In a regular Markov model, the state is directly visible to the observer, and therefore the state transition probabilities are the only parameters. In a HMM, the state is not directly visible, but output dependent on the state is visible. Note that the adjective "hidden" refers to the state sequence through which the model passes, not to the parameters of the model; even if the model parameters are known exactly, the model is still hidden.

As illustratively used herein, the Viterbi algorithm is a dynamic programming algorithm for finding the most likely sequence of hidden states, called the Viterbi path, which results in a sequence of observed events, especially in the context of Markov information sources, and more generally, HMMs. The terms "Viterbi path" and "Viterbi algorithm" are also applied to related dynamic programming algorithms that discover the single most likely explanation for an observation. For example, in statistical parsing, a dynamic programming algorithm can be used to discover the single most likely context-free derivation (parse) of a string, which is sometimes called the "Viterbi parse."

For ease of reference, the remainder of the detailed description is divided into the following sections. In section I (Discriminative Training of Feature Space), the fMPE is generally explained including processing and memory issues, and illustrative principles of the invention for overcoming these and other issues are outlined. In section II (fMPE Parameters and Processing Pipeline), fMPE is described in more detail. In section III (Quantization of Level 1 Transforms), an inventive quantization methodology for compressing the transform parameter space associated with the fMPE process is described. In section IV (Optimal Quantization Level and Bit Allocation with a Viterbi Search), a Viterbi search procedure is described for use with the quantization methodology of section III. In section V (Illustrative ASR System and Methodology), an illustrative ASR system and methodology that implements the illustrative principles of section III is described. In section VI (Illustrative Computing System), an illustrative computing system for use in implementing one or more systems and methodologies of the invention is described.

I. Discriminative Training of Feature Space fMPE is a technique for discriminative training of feature space (DTFS) for automatic speech recognition systems (ASR) using a minimum phone error (MPE) objective function. fMPE is disclosed in Povey, D., et. al., "FMPE: Discriminatively Trained Features for Speech Recognition," in ICASSP, 2005, the disclosure of which is incorporated herein by reference, and later enhanced as disclosed in Povey, D., "Improvements to fMPE for Discriminative Training of Features," in Interspeech, 2005, the disclosure of which is incorporated herein by reference.

MPE is a technique, using a minimum phone error objective (MPE objective function) function, for discriminative training of hidden Markow model (HMM) parameters. fMPE is a method of discriminatively training features. fMPE applies the minimum phone error objective function to the features, transforming the data with a kernel-like method and training, for example, millions of parameters.

DTFS in an ASR system using an MPE objective function has been shown to yield accurate, consistent and stable results, for example, when used in conjunction with either discriminatively or maximum likelihood trained HMM parameters.

On an automotive speech recognition of Chinese language task, the above DTFS using fMPE have given remarkable improvements over prior techniques. For instance, in an embedded setup the sentence error rate for a maximum likelihood trained system is 10.13%, with model space discriminative training, the error rate is 8.32%, and with DTFS with fMPE, the error rate is 7.24%.

The price of the improvement associated with DTFS with fMPE in ASR is a parameter space (e.g., a transform parameter space) consisting of a very large number (e.g., millions) of parameters, and recognition accuracy that rapidly degrades when the number of parameters are reduced. This introduces a tradeoff in embedded ASR systems where optimal fMPE performance translates into unacceptable consumption of memory.

Thus, an undesirable tradeoff in embedded ASR systems is that the optimal fMPE performance corresponds to use of very large amounts of memory, for example, unacceptably large amounts of memory associated with the very large number of parameters.

Accordingly, principles of the invention provide, for example, techniques to maintain optimal, or near optimal, fMPE performance while reducing the required memory by as much as approximately 95% to 98%. This is achieved by a quantization methodology which minimizes the error between the true fMPE computation and the computation produced with quantized parameters. The transform parameters of the transform are quantized. Very little, if any, degradation in sentence error rate is caused by quantizing the transform parameters. Dimension dependent quantization tables may be used and the quantization values may be learned with a fixed assignment of transform parameters to quantization values.

Principles of the invention further provide, for example, methods to assign the transform parameters to quantization values, and methods of using a Viterbi algorithm to gradually reduce the amount of memory needed by optimally assigning variable number of bits to dimension dependent quantization tables.

Principles of the invention further provide, for example, methods to reduce fMPE associated memory size requirements, while maintaining recognition accuracy. The memory size reduction with maintained accuracy may be achieved by quantizing blocks of fMPE transform parameters using separate quantization tables, and learning the optimal quantization values for a given assignment of transform parameter to quantization values.

Principles of the invention may further provide a Viterbi procedure or algorithm that determines the number of quantization levels to use for each quantization table.

Principles of the invention may further provide for the learned mapping of transform parameters to quantization values.

Principles, methods and techniques of the invention may also be applied to quantization of general linear transforms.

II. fMPE Parameters and Processing Pipeline

The AVE process can be described by two fundamental stages. The first stage, level 1, relies on a set of Gaussians $\mathcal{G}$ to convert an input d-dimensional feature vector $x_t$ to offset features:

$$o(t,g,i)=\begin{cases}\gamma_g\dfrac{(x_t^{(i)}-\mu_g^{(i)})}{\sigma_g^{(i)}} & \text{if } i\le d\\ 5\gamma_g & \text{if } i=d+1\end{cases} \quad \text{EQ. 1}$$

where t denotes time, and i denotes offset dimension. $\gamma_g$ is the posterior probability of $g\in\mathcal{G}$ given $x_t$. The set $\mathcal{G}$, of size G, is arrived at by clustering the Gaussians of the original acoustic model.

In general o(t,g,i) contains (d+1)G elements for each time t. For computational efficiency all $\gamma_g$ below a threshold $\gamma_{cut}$ are set to 0 resulting in a sparse o(t,g,i).

The offset features are operated on by a level 1 transform $M^1$(g,i,j,k):

$$b(t,j,k)=\sum_{g,i}M^1(g,i,j,k)o(t,g,i) = \sum_{g:\gamma_g>\gamma_{cut}}\sum_i M^1(g,i,j,k)o(t,g,i). \quad \text{EQ. 2}$$

where $M^1$ is parameterized by Gaussian $g\in\mathcal{G}$, offset dimension $i\in\{1,\ldots,d+1\}$, an outer-context $j\in\{1,\ldots,2J+1\}$ and final output dimension $k\in\{1\ldots d\}$.

The next stage of fMPE, level 2, takes as input b(t+τ,j,k) for $\tau\in\{-\Lambda,\ldots,\Lambda\}$. It computes its output as:

$$\delta(t,k)=\sum_j\sum_\tau M^2(j,k,\tau+\Lambda+1)b(t+\tau,j,k). \quad \text{EQ. 3}$$

The output of level 2, δ(t,k), is added to $x_t(k)$ to compute the fMPE features.

By way of example only, G=128, d=40, J=2, and Λ=8. This results in $M^1$ with 128*41*40*5=1049600 parameters. The posterior threshold $\gamma_{cut}$ is typically 0.1, resulting in a small number of active Gaussians per $x_t$. For each active Gaussian, level 1 requires 41*40*5=8200 floating point operations. At level 2, $M^2$ contains 5*40*(2*8+1)=3400 parameters, and computation of δ(t,k) at level 2 requires 3400 floating point operations.

As seen above, the level 1 fMPE process dominates in the amount of CPU and memory used. For the example given here, 1.05 million $M^1$ parameters use 4.2M of memory, about twice the memory used by our standard non-fMPE embedded acoustic model.

It is also realized that, in other configurations, fMPE transform size could be up to 50 times the acoustic model size, making it imperative to reduce memory footprint of this transform if it is to be used in resource constrained environments.

III. Quantization of Level 1 Transforms

In accordance with illustrative principles of the invention, to quantize level 1 transform $M^1$, the strategy of quantizing blocks of parameters using separate quantization tables is used. Once the blocks are decided, a number of quantization levels to use for each block is chosen. The quantization values are then initialized and each parameter is assigned to a quantization value.

A. Initialization.

Global, linear (GlobalL), Per Gaussian, k-means (GaussK), and Per Dimension, k-means (DimK) parameter blocks and initialization strategies are considered.

Global, linear (GlobalL): All entries of $M^1$ were quantized using a single quantization table.

Per Gaussian, k-means (GaussK): Parameters corresponding to each Gaussian index g in $M^1$(g,i,j,k) have their own quantization table.

Per Dimension, k-means (DimK): Parameters corresponding to each dimension index k have their own quantization table.

Next, iteratively optimize quantization values and parameter to quantization value assignments as described herein below.

B. Optimization of Quantization Values

Let $\delta^Q(t,k)$ denote the feature perturbation obtained using the quantized level 1 transform $M^{1Q}$. To learn $M^{1Q}$, minimize $$E=\sum_{t,k}(\delta(t,k)-\delta^Q(t,k))^2. \quad \text{EQ. 4}$$

Using indicators $I_p$(g,i,j,k) and quantization table $q=\{q_p\}$, $M^{1Q}$(g,i,j,k) can be written as:

$$M^{1Q}(g,i,j,k)=\sum_p q_pI_p(g,i,j,k). \quad \text{EQ. 5}$$

To ensure that $M^{1Q}$(g,i,j,k) is equal to one of the quantization values in q, impose the additional constraint that for each (g,i,j,k) only one of $I_p$(g,i,j,k) can be equal to 1. The quantized level 1 features, corresponding to EQ. 2 are:

$$b^Q(t,j,k)=\sum_p q_p\sum_{g,i}I_p(g,i,j,k)o(t,g,i), \quad \text{EQ. 6}$$

and the quantized perturbation (EQ. 3):

$$\delta^Q(t,k)=\sum_p q_p\sum_{j,l}M^2(j,k,l)\times\sum_{g,i}I_p(g,i,j,k)o(t+l-ictx-1,g,i). \quad \text{EQ. 7}$$

Define the level 1 statistic as:

$$S^1(t,j,k,p)=\sum_{g,i}I_p(g,i,j,k)o(t,g,i), \quad \text{EQ. 8}$$

and define the level 2 statistic as:

$$S^2(t,k,p)=\sum_{j,l}M^2(j,k,l)S^1(t+l-ictx-1,j,k,p). \quad \text{EQ. 9}$$

The quantized perturbation (EQ. 7) becomes:

$$\delta^Q(t,k)=\sum_p q_pS^2(t,k,p), \quad \text{EQ. 10}$$

and the error (EQ. 4) is a quadratic in q:

$$E = \sum_{t,k}\left(\delta(t,k) - \sum_p q_p S^2(t,k,p)\right)^2 = \sum_k A(k) + q^T B(k) q - 2q^T c(k), \quad \text{EQ. 11}$$

where:

$$A(k) = \sum_t \delta(t,k)^2$$

$$B(k, p_1, p_2) = \sum_t S^2(t,k,p_1) S^2(t,k,p_2)$$

$$c(k,p) = \sum_t \delta(t,k) S^2(t,k,p).$$

The minimum is achieved at:

$$\hat{q} = \left(\sum_k B(k)\right)^{-1} \sum_k c(k). \quad \text{EQ. 12}$$

If there is a separate quantization table q(k) per dimension, then $$E = \sum_k E(k)$$

with:

$$E(k)=A(k)+q^T(k)B(k)q(k)-2q^T(k)c(k), \quad \text{EQ. 13}$$

and minimum attained at:

$$\acute{q}(k)=B^{-1}(k)c(k), \quad \text{EQ. 14}$$

with:

$$\acute{E}(k)=A(k)+\acute{q}^T(k)B(k)\acute{q}(k)-2\acute{q}^T(k)c(k). \quad \text{EQ. 15}$$

Note that the sufficient statistics, and consequently the optimum q́(k), are a function of $I_q(g,i,j,k)$. Further reduction in error may be obtained by reassigning $M^1$ entries to quantization levels (i.e., updating $I_q(g,i,j,k)$) and iterating. This is discussed in the consideration of optimization of partition indicators herein below.

C. Scale Invariance, Level 1 and 2 Scaling

From EQ. 2 and EQ. 3, note that δ(t,k) can be expressed in terms of the product $M^1(g,i,j,k)M^2(j,k,l)$. δ(t,k) is therefore invariant to the following form of scaling:

$$\frac{M^1(g,i,j,k)}{a(j,k)}(M^2(j,k,l)a(j,k)). \quad \text{EQ. 16}$$

The quantization levels do not satisfy the same scale invariance, and so q́(k) and the accuracy of the quantization will change with the scaling a(j,k).

With the a(j,k) scaling the level 2 statistic (EQ. 9) becomes:

$$S^2(t,j,k,p) = \sum_l a(j,k) M^2(j,k,l) \times S^1(t+l-ictx-1, j, k, p), \quad \text{EQ. 17}$$

where the summation across outer dimension j has been removed. The error to be minimized becomes:

$$E = \sum_t \delta(t,k)^2 - 2\sum_t \delta(t,k) \sum_p q_p(k) \sum_j S^2(t,j,k,p) + \sum_{p_1,p_2} q_{p_1}(k) q_{p_2}(k) \times \sum_t \sum_{j_1,j_2} S^2(t,j_1,k,p_1) S^2(t,j_2,k,p_1). \quad \text{EQ. 18}$$

Given that the analytic minimum with respect to q(k) is known, the per dimension error is:

$$E(k) = A(k) + \sum_{j_1} a(j_1,k) c_{j_1}^T(k) \times \left(\sum_{j_3,j_4} a(j_3,k) a(j_4,k) B_{j_3,j_4}(k)\right)^{-1} \times \left(\sum_{j_2} a(j_2,k) c_{j_2}(k)\right), \quad \text{EQ. 19}$$

where:

$$B(k) = \sum_{j_1,j_2} a(j_1,k) a(j_2,k) B_{j_1,j_2}(k) \quad \text{EQ. 20}$$

$$B_{j_1,j_2}(k,p_1,p_2) = \sum_t S^2(t,j_1,k,p_1) S^2(t,j_2,k,p_2)$$

$$c(k) = \sum_j a(j,k) c_j(k)$$

$$c_j(k,p) = \sum_t \delta(t,k) S^2(t,j,k,p).$$

It may not be clear how to optimize (EQ. 19) analytically with respect to $\{a(j,k)\}_j$; therefore, numerical optimization is used. The gradient of E(k) is given by:

$$\frac{\partial E(k)}{\partial a(j,k)} = 2c(k)^T B(k)^{-1} c_j(k) - 2c^T(k) B(k)^{-1} \times \left(\sum_{j2} a(j_2,k) B_{j_2,j}(k)\right) B(k)^{-1} c. \quad \text{EQ. 21}$$

It is noted that the quantization levels do not satisfy the same scale invariance, and so q́(k) and the accuracy of the quantization will change with the scaling a(j,k).

D. Optimizing the Partition Indicators $I_q(g,i,j,k)$

This section discusses optimizing the partition indicators $I_p(g,i,j,k)$. It seems logical that having a large number of quantization levels in q, the Euclidean distance based assignment of parameters to quantization values would be sufficient. However, for smaller number of quantization levels this may be significantly suboptimal.

Combining EQ. 2 and EQ.3 gives:

$$\delta(t,k)=\sum_{j,\tau} M^2(j,k,\tau+\Lambda+1)\times\Big(\sum_{g,i} M^1(g,i,j,k)o(t+\tau,g,i)\Big). \quad \text{EQ. 22}$$

Use $\overline{M}^1(j,k)=vec_{g,i}(M^1(g,i,j,k))$ and $\overline{o}(t+\tau)=vec_{g,i}(o(t+\tau,g,i))$ as (d+1)G dimensional vector representations. With this EQ. 22 becomes:

$$\begin{aligned}\delta(t,k)&=\sum_{j,\tau} M^2(j,k,\tau+\Lambda+1)\big[\overline{M}^1(j,k)^T\overline{o}(t+\tau)\big]\\&=\sum_j \overline{M}^1(j,k)^T\Big[\sum_\tau M^2(j,k,\tau+\Lambda+1)\overline{o}(t+\tau)\Big].\end{aligned}$$

Defining:

$$\hat{o}(t,j,k)=\sum_t M^2(j,k,\tau+\Lambda+1)\overline{o}(t+\tau), \quad \text{EQ. 23}$$

the fMPE perturbation is given as:

$$\delta(t,k)=\sum_j \overline{M}^1(j,k)^T\hat{o}(t,j,k). \quad \text{EQ. 24}$$

Quantization of the level 1 transform results in:

$$\delta^Q(t,k)=\Sigma_j\overline{M}^{1Q}(j,k)^T\hat{o}(t,j,k).$$

The quantization error for dimension k now becomes:

$$E(k)=\sum_{j_1,j_2}\Delta\overline{M}^{1Q}(j_1,k)^T V_{j_1j_2k}\Delta\overline{M}^{1Q}(j_2,k) \quad \text{EQ. 25}$$

where:

$$\Delta\overline{M}^{1Q}(j,k)=\overline{M}^1(j,k)-\overline{M}^{1Q}(j,k) \quad \text{EQ. 26}$$

and $$V_{j_1j_2k}=\sum_t \hat{o}(t,j_1,k)\hat{o}^T(t,j_2,k)$$

is the [G(d+1)]×[G(d+1)] matrix containing the training time statistic for outer context pair $j_1,j_2$ and dimension k. Note that the statistics $V_{j_1j_2k}$ requires a signficant amount of storage. The exact number of parameters is:

$$G^2(d+1)^2d\binom{2J+1}{2},$$

which is 66 gigibits (GB) when stored as floats.

Using EQ. 5, the vector $\overline{M}^{1Q}(j,k)$ can be expressed as:

$$\overline{M}^{1Q}(j,k)=S(j,k)\cdot q(k) \quad \text{EQ. 27}$$

The quantization level selector matrix S(j,k) is a matrix of dimension G(d+1)×n where n is the number of levels in q(k). The row of S(j,k) corresponding to element $M^{1Q}(g,i,j,k)$ consists of partition indicators $I_p(g,i,j,k)$. As discussed earlier, each row has a single 1 (one) indicating the selected quantization value, and all other entries are 0 (zero). The optimization will entail changing the positions of the indicators in the S(j,k) matrix. For row r, the quantization level re-assignment from level p to x is represented as:

$$S'(j,r,k)=S(j,k)-e_re_p^T+e_re_x^T, \quad \text{EQ. 28}$$

where $e_r$ is a vector of dimension G(d+1), containing a 1 (one) in dimension r; and $e_p$,$e_x$ are vectors of dimension n, containing a 1 (one) in the $p^{th}$ and $x^{th}$ dimension respectively.

Changing quantization level assignment of outer context j and row r produces a resultant change in E(k) of EQ. 25. For convenience in what follows index k is droped as all computations are specific to a particular dimension. Substituting EQ. 28 and EQ. 27 into EQ. 25 gives:

$$\begin{aligned}\Delta E(j,r)=&\Delta\overline{M}^{1Q}(S,j)^T V_{jj}\Delta\overline{M}^{1Q}(S,j)+\\&2\sum_{j_1\neq j}\big(\overline{M}^1(j_1)-S(j_1)\cdot q\big)^T V_{j_1j}\Delta\overline{M}^{1Q}(S,j)\end{aligned} \quad \text{EQ. 29}$$

$\Delta\overline{M}^{1Q}(S,j)$ is given by:

$$\Delta\overline{M}^{1Q}(S,j)=\overline{M}^1(j)-S(j)\cdot q-e_r\Delta q(x), \quad \text{EQ. 30}$$

and $\Delta q(x)=(e_x-e_p)^Tq$.

Expanding EQ. 29 and collecting terms forms the quadratic expression:

$$\Delta E=a(j,r)\Delta q(x)^2+b(j,r)\Delta q(x)+c(j,r), \quad \text{EQ. 31}$$

where a(j,r) and b(j,r) are:

$$a(j,r)=V_{jj}(r,r)$$

$$b(j,r)=2\sum_{j_1}\big(q^T\cdot S(j_1)^T-\overline{M}^1(j_1)^T\big)V_{j_1j}(:,r)$$

and c(j, r) is a constant that is not relevant to optimization.

For a given dimension k with (r,j) entry update of the quantization level for matrix $M^{1Q}(j)$, the updated error is:

$$E'(k)=E(k)+\Delta E(k), \quad \text{EQ. 32}$$

where E(k) is the unchanged contribution. From EQ. 31 and definition $\Delta q(x)=(e_x^T-e_p^T)\cdot q_n$, minimization of $\Delta E(k)$ yields the updated quantization value $\acute{q}_x$.

$$\frac{\partial\Delta E}{\partial\Delta q(x)}=2a(j,r)\Delta q(x)+b(j,r)=0 \quad \text{EQ. 33}$$

$$\Delta q(x)=-\frac{b(j,r)}{2a(j,r)}$$

$$\hat{q}_x=q_P-\frac{b(j,r)}{2a(j,r)},$$

where the (r,j) entry is re-assigned to quantization level x if:

$$\|\acute{q}_x-q_x\|_2<\|\acute{q}_x-q_i\|_2,\ 1\leqq i\leqq n(k), i\neq x \quad \text{EQ. 34}$$

where n(k) denotes the number of available quantization levels for dimension k.

E. Training Procedure for Quantization Values and Partition Indicators

All optimizations are performed separately for each dimension. The following procedure may be used:

Step 1) Perform an initial quantization of the level 1 transform $M^1$ using the DimK approach described in section III A.

Step 2) qLearn (L): Estimate the quantization values as described in section III B.

Step 3) qLearn+Scale (LS): Estimate the scaling a(j,k) and the corresponding quantized values described in section III C.

Step 4) qLearn+Mapping (LM): Learn the partition indicators (see section III D), with quantization values from section III B. This is an iterative procedure where we cycle through all $M^{1Q}$ entries by row and outer context (r,j). There are various methods to chose the (r,j) pairs, the techniques presented herein are: (i) for a given outer context j, perform the re-assignments by increasing row; (ii) for a given row r, re-assign by increasing outer context j; and (iii) select the (r,j) pairs by random.

Partition indicator learning (step 4 above) could also be accomplished using the LS result. For the sake of simplicity this is not presented herein, as this requires generation of the statistic (EQ. 26) in the scaled space.

Multiple iterations through all (r,j) pairs is performed until the percentage of quantization level re-assignments become negligible. Note that once step 4 is complete, the quantization values as in step 2 may be refined; this is denoted by LM-L (qLearn+Mapping and learned values). Alternatively, quantization values and scale could be learned as in step 3; this is denoted by LM-LS (qLearn+Mapping and qLearn+Scale).

IV. Optimal Quantization Level and Bit Allocation with a Viterbi Search

Let $1 \leqq n(k) \leqq L$ denote the number of levels in q(k). The independence of errors E(k) across dimensions allows a Viterbi procedure to be formulated that finds optimal allocation n(k). Optimal allocation with respect to the total number of levels $$n = \sum_k n(k)$$

has previously been found. However, the total number of levels is related to the size in a nonlinear way; the size of $M^{1Q}$ in an optimal encoding is:

$$G(d+1)(2J+1)\sum_k \log_2(n(k)).$$

There will be additional processing overhead (e.g., processing by a processor device) to encode n(k) optimally when n(k) is not a power of 2 (two). The following Viterbi procedure takes storage and implementation into account:

1) Initialize $V(1,b)=E(1,2^b)$ for $1 \leqq 2^b \leqq L$

2) For k=2, . . . d, apply the recursive relation:

$$V(k, b) = \min_{b_1+b_2=b} (E(k, 2^{b_1}) + V(k-1, b_2))$$

3) Once k=d is reached, backtrack to find bit assignment for each dimension.

By forcing the number of levels to be $2^b$, exactly b bits to encode the corresponding level can be used. One or more of the Viterbi procedures described herein are carried out after LMLS as discussed above in section III E.

V. Illustrative ASR System and Methodology

We now give an overall explanation of the functionality of the components of an illustrative ASR system employing such inventive compression in the form of quantization as described above.

FIG. 1 is a block diagram of an illustrative ASR system 100 according to an embodiment of the invention. The ASR system 100 comprises a model learning portion 100A, a quantization portion 100B and a test speech, or real-time, recognition portion 100C. The model learning portion 100A of the ASR system 100 is configured to perform fMPE level 1 and level 2 transforms (e.g., floating point transforms as described above in section II), and to learn an acoustic model estimated by acoustic model estimator 104. The acoustic model is also referred to herein as the speech recognition model. The quantization portion 100B is configured to perform or learn quantization of the level 1 transform (as described above in section III). A speech recognition portion 100C is configured to recognize speech after training and quantization. The model learning portion 100A and the quantization portion 100B together perform functions of learning or training of the acoustic model and optimization of the fMPE level 1 transform. Taken together portions 100A and 100B are referred to herein as the training portions of ASR system 100.

As shown, the model learning portion 100A of ASR system 100 accepts training speech as input for the purpose of training the acoustic model, for example, an HMM, to be used in the speech recognition portion 100C for subsequent automatic speech recognition. The speech to be recognized by portion 100C is termed herein as test speech. Both training speech and test speech are, for example, dialog spoken into a microphone and converted by the microphone into an analog signal. The microphone may be considered as part of a pre-processor (PP) 101.

Portions 100A, B and C comprise at least one pre-processor 101. Pre-processors 101 receive the training speech and test speech and generate representative speech waveforms, i.e., a speech signal. The pre-processors 101 may include, for example, an audio-to-analog transducer (microphone) and an analog-to-digital converter which respectively transduce the speech into an electrical signal (e.g., an analog signal) and then convert the electrical signal into a digital signal representative of the speech uttered. Further, the pre-processors 101 may sample the speech signal and partition the signal into overlapping frames so that each frame is discretely processed by the remainder of the system. The output signal of the pre-processors 101 are the sampled speech waveforms or speech signal which is recorded and provided to feature extractors 102. FIG. 1 illustrates a number of pre-processors 101; however, fewer or even a single pre-processor 101 common to all portions 100A, B and C could be used.

Portions 100A, B and C comprise at least one feature extractor 102 coupled to a pre-processor 101. Feature extractors 102 receive the speech signals from the pre-processors 101 and extracts or computes features of the speech. For example, extracted features of the training speech and test speech may represent the spectral-domain content of the speech (e.g., regions of strong energy at particular frequencies). By way of example only, these features may be computed every 10 milliseconds, with one 10-millisecond section called a frame. By way of example only, as is known in the art, the features may be cepstral features extracted at regular intervals from the signal, for example, about every 10 milliseconds. The cepstral features are in the form of feature or speech vectors (signals). Features are then passed to transform modules 1031, 1033 or 1034 as indicated by the flows in FIG. 1. FIG. 1 illustrates a number of feature extractors 102; however, fewer or even a single feature extractor 102 common to all portions 100A, B and C could be used.

The model learning portion 100A further comprises a transform module 1031 and the acoustic model estimator 104. The transform module 1031 performs fMPE transformation (as explained in detail above in section II) using, for example, the MPE objective function. Referring to the model learning portion 100A, as is known in the art, the features (e.g., the speech vectors) representing the training speech are transformed according to the fMPE transform process and used to train acoustic models such as, for example, Gaussian mixture models or HMMs, which may then be used by the system, in the speech recognition portion 100C, to decode test speech received during the course of, for example, a real-time application.

The quantization portion 100B further comprises a transform module 1031, a quantized transform module 1033 and a summing module 107. The transform module 1033 may also use, for example, the MPE objective function. The operation of 100B follows the process described in section III. That is, the quantization portion 100B minimizes an error by comparing or summing a function δ(t,k), resulting from application of both level 1 and level 2 transforms by transform module 1031, and a function $\delta^Q(t,k)$, resulting from application a level 1 transform with quantization and a level 2 transform. The error is described in section III B and expressed there as error function $$E = \sum_{t,k} (\delta(t,k) - \delta^Q(t,k))^2. \qquad \text{(EQ. 4)}$$

As indicated by a feedback path from the output of the summing module 107 to the quantized transform module 1033, the error may be minimized by iteratively repeating the quantization associated with the level 1 transform and the subsequent level 2 transform by the quantized transform module 1033, and the calculation of the error function by the summing module 107. The feedback illustrates the iterative change in quantization values and subsequent assignment from floating point parameter values to one of the quantization levels. Thus, EQ. 4 is optimized, resulting in learning the quantization levels as expressed by EQ. 12, and resulting in the corresponding mapping to the learned quantization levels as expressed by EQ. 33 and EQ. 34. The quantization level learning and mapping may be thus iterated.

Note that, in one embodiment, because the transform modules 1031 and 1033 provide transforms using the minimum phone error objective function, the assignment of the quantization levels and/or the assigning of the transform parameters are, therefore, according to the minimum phone error function.

Once the error is minimized or reduced to an acceptable level, for example, a predetermined level, the learning procedure terminates with the final assignment of quantization levels to quantization values and assignment of parameters to quantization values as described above in section III. At this point, the quantization is considered learned or formed and is useful for application in the speech recognition portion 100C.

The speech recognition portion 100C comprises, in addition to a pre-processor 101 and a feature extractor 102, a transform module 1034 which includes the optimized fMPE transform as learned during the learning procedure employing quantization portion 100B. The speech recognition portion 100C further comprises an acoustic model scoring module 105, applying the acoustic model learned or formed during the training procedure by the model learning section 100A, and a search module 106 in order to recognize speech after being transformed by the quantized level 1 and the level 2 transform. The methods employed by the acoustic model scoring module 105 and the search module 106 are known in the art.

Figure 2:
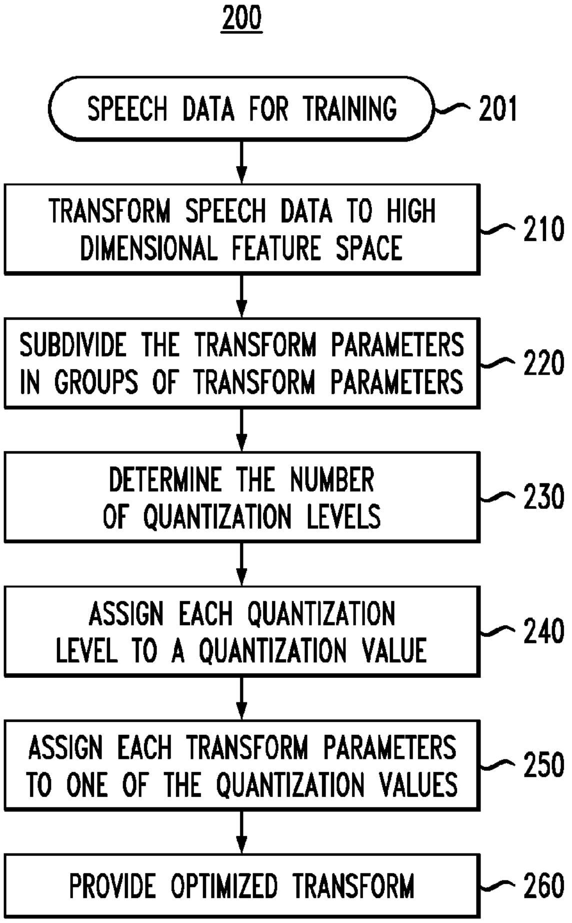
FIG. 2 shows a block diagram of a method used to estimate the quantization of a feature space transform according to an exemplary embodiment of the invention.

FIG. 2 is a block diagram of a method 200 used to estimate the quantization of a feature space transform according to an embodiment of the invention. Method 200 may be, for example, used for optimizing a quantization of a transformed feature space of an ASR system, for example, ASR system 100. The method 200 accepts speech data 201 as input. This speech data is denoted as training-speech data or training data. The output of the method 200 is the optimized fMPE transform (1034 in FIG. 1).

Step 210 transforms features of the training data into a high-dimensional space according to the fMPE method previously described. The transform produces a very high number of transform parameters. Thus, step 210 provides a transform of the training data. The transform comprises a plurality of transform parameters.

Step 220 groups the transform parameters into a number of groups. Grouping may be, for example, according to the GaussK or DimK methods previously described in section III A. Alternately, the transform parameters may not be subdivided but remain in a single group according to the GlobalL method previously described in section III A. In the GaussK method, the groups of transform parameters are determined according to correspondence of each of the transform parameters with one or more Gaussian indices of the transform. In the DimK method, the groups of transform parameters are determined according to correspondence of each of the transform parameters with one or more dimension indices of the transform.

Step 230 determines the number of quantization levels, that is, the number of quantization levels to use for each quantization table. The number of quantization levels is determined according to methods previously presented in section III. If there is more than one group of parameters, the number of quantization levels may be determined for each group of parameters, that is, the determining of the number of levels may comprise determining, for each group, an associated number of quantization levels. The number of levels may be determined, for example, according to reducing an error defined by an error function specific to a particular dimension of the transform, or according to a Viterbi algorithm. By way of example only, the amount of memory needed to perform automatic speech recognition is reduced by assigning a variable number of data-bits to transform-dimension dependent quantization tables according to the Viterbi algorithm Each quantization level is assigned to a quantization value in step 240. The assignment of the quantization level to the quantization value is according to methods presented in section III. If the transform parameters have been subdivided into groups, the assigning of a quantization level comprises assigning, separately for each of the groups, each of the quantization levels for that group.

Each transform parameter is assigned, in step 250, to one of the quantization values to which a quantization level has been assigned. The assignment of the transform parameters is performed according to methods presented in section III. If the transform parameters have been subdivided into groups, transform parameter within any given group are assigned to one of the quantization values to which one of the quantization levels associated with that given group to have been assigned. In one embodiment, all of the transform parameters are assigned to quantization values of a common set of quantization levels comprising, for example, the determined number of quantization levels. The quantization methodology may minimizes an error between the true fMPE computation and the computation produced with quantized parameters, that is, quantization values may be determined, for example, to minimize or reduce an error defined by an error function specific to a particular dimension of the transform. The error function may, for example, comprise a computation including all or some of the transform parameters assigned to the quantization values.

Step 260 provides the optimized transform comprising the assigned quantization levels and the assigned transform parameters. For example, the optimized transform may be provided to transform module 1034 of FIG. 1.

The method 200 may be performed, for example, by a speech transforming module configured to perform step 210, a parameter grouping module configured to perform step 220, a number-of-level determining module 230 configured to perform step 230, a level assignment module configured to perform step 240, a parameter assignment module configured to perform step 250 and a training module configured to perform step 260. Although FIG. 2 shows an exemplary flow, the flow is not so limited; other flows are possible.

VI. Illustrative Computing System

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 2, the diagrams in the Figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-2, can also include, as described herein, providing a system, wherein the system includes distinct modules (e.g., modules comprising software, hardware or software and hardware). By way of example only, the modules may include: a speech transforming module 210; a parameter grouping module 220; a number-of-level determining module 230; a level assignment module 240; a parameter assignment module 250 and a training module 260. An additional exemplary module is a transform obtaining module configured to obtain a transform comprising a plurality of transform parameters. These and other modules may be configured, for example, to perform the steps of described and illustrated in the context of FIGS. 1-2.

Figure 3:
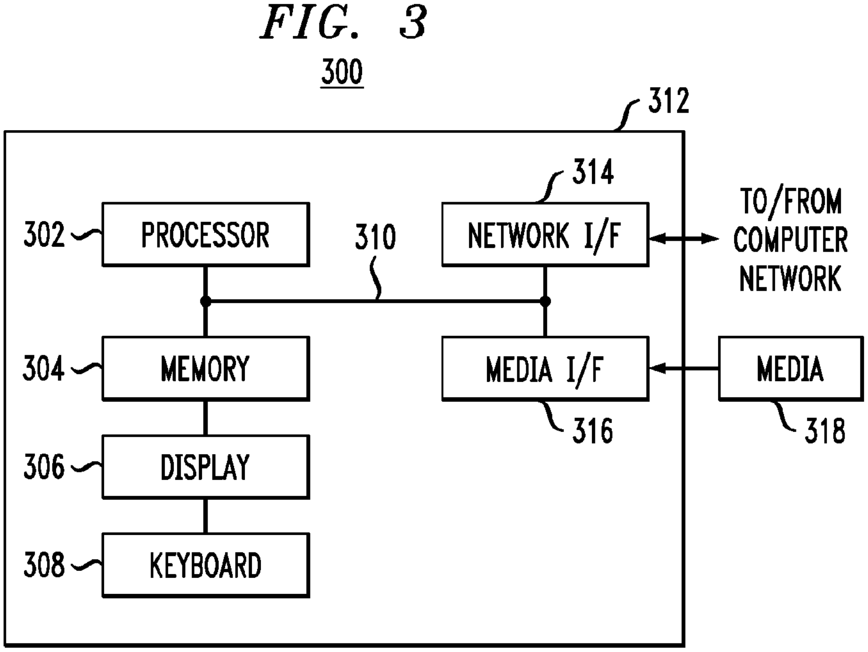
FIG. 3 depicts a computer system that may be useful in implementing one or more aspects and/or elements of the invention.

One or more embodiments can make use of software running on a general purpose computer or workstation. With reference to FIG. 3, such an implementation 300 employs, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 302, memory 304, and input/output interface such as display 306 and keyboard 308 can be interconnected, for example, via bus 310 as part of a data processing unit 312. Suitable interconnections, for example, via bus 310, can also be provided to a network interface 314, such as a network card, which can be provided to interface with a computer network, and to a media interface 316, such as a diskette or CD-ROM drive, which can be provided to interface with media 318.

A data processing system suitable for storing and/or executing program code can include at least one processor 302 coupled directly or indirectly to memory elements 304 through a system bus 310. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 308, display 306, pointing device, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of compressing a transform associated with a feature space, the method comprising:

obtaining the transform comprising a plurality of transform parameters;

assigning each of a plurality of quantization levels for the plurality of transform parameters to one of a plurality of quantization values; and assigning each of the plurality of transform parameters to one of the plurality of quantization values to which one of the plurality of quantization levels is assigned;

wherein one or more of the obtaining of the transform, the assigning of each of the plurality of quantization levels, and the assigning of each of the transform parameters are implemented as instruction code executed on a processor device.

2. The method of claim 1 further comprising:

determining a number of levels of the plurality of quantization levels.

3. The method of claim 2 further comprising:

subdividing the plurality of transform parameters into a plurality of groups of transform parameters;

wherein the determining of the number of levels comprises determining, for each of the plurality of groups, an associated number of levels of the plurality of quantization levels;

wherein the assigning of each of the plurality of quantization levels comprises assigning, separately for each of the plurality of groups, each of the plurality of quantization levels of the each of the plurality of groups; and wherein the assigning of each of the plurality of transform parameters comprises assigning to one of the quantization values to which one of the plurality of quantization levels associated with the group that the each of the plurality of transform parameters belongs to is assigned.

4. The method of claim 1, wherein all of the plurality of transform parameters are assigned to quantization values of a common set of quantization levels comprising the plurality of quantization levels.

5. The method of claim 3, wherein the plurality of groups of transform parameters are determined according to correspondence of each of the plurality of transform parameters with one or more Gaussian indices of the transform.

6. The method of claim 3, wherein the plurality of groups of transform parameters are determined according to correspondence of each of the plurality of transform parameters with one or more dimension indices of the transform.

7. The method of claim 1, wherein the quantization values are determined according to reducing an error defined by an error function specific to a particular dimension of the transform.

8. The method of claim 7, wherein the error function comprises a computation comprising at least a portion of the plurality of transform parameters assigned to the plurality of quantization values.

9. The method of claim 2, wherein the number of levels are determined according to reducing an error defined by an error function specific to a particular dimension of the transform.

10. The method of claim 2, wherein the determining of the number of levels is determined using a Viterbi algorithm.

11. The method of claim 10, wherein an amount of memory needed to perform automatic speech recognition is reduced by assigning a variable number of data-bits to transform-dimension dependent quantization tables according to the Viterbi algorithm.

12. The method of claim 1, wherein the transform parameters are associated with the discriminative training of features.

13. The method of claim 1, wherein the transform is according to a minimum phone error function.

14. The method of claim 13, wherein at least one of (i) the assigning of each of the plurality of quantization levels, and (ii) the assigning of each of the plurality of transform parameters is according to the minimum phone error function.

15. The method of claim 1, wherein the feature space is associated with speech data for automatic speech recognition.

16. A system for compressing a transform associated with a feature space, the system comprising:

a memory to store program instructions; and a processor that executes the program instructions to implement a plurality of modules, the modules comprising:

a transform obtaining module configured to obtain the transform comprising a plurality of transform parameters;

a level assignment module configured to assign each of a plurality of quantization levels for the plurality of transform parameters to one of a plurality of quantization values; and a parameter assignment module configured to assign each of the plurality of transform parameters to one of the plurality of quantization values to which one of the plurality of quantization levels is assigned;

wherein one or more of the obtaining of the transform, the assigning of each of the plurality of quantization levels, and the assigning of each of the transform parameters are implemented as instruction code executed on a processor device.

17. The system of claim 16 further comprising:

a level determining module configured to determine a number of levels of the plurality of quantization levels.

18. The system of claim 16 further comprising:

a parameter grouping module configured to subdividing the plurality of transform parameters into a plurality of groups of transform parameters;

wherein the determining of the number of levels comprises determining, for each of the plurality of groups, an associated number of levels of the plurality of quantization levels;

wherein the assigning of each of the plurality of quantization levels comprises assigning, separately for each of the plurality of groups, each of the plurality of quantization levels of the each of the plurality of groups; and wherein the assigning of each of the plurality of transform parameters comprises assigning to one of the quantization values to which one of the plurality of quantization levels associated with the group that the each of the plurality of transform parameters belongs to is assigned.

19. Apparatus for compressing a transform associated with a feature space, the apparatus comprising:

a memory; and a processor coupled to the memory and configured to:

obtain the transform comprising a plurality of transform parameters;

assign each of a plurality of quantization levels for the plurality of transform parameters to one of a plurality of quantization values; and assign each of the plurality of transform parameters to one of the plurality of quantization values to which one of the plurality of quantization levels is assigned.

20. The apparatus of claim 19 further configured to:

determine a number of levels of the plurality of quantization levels.

21. The apparatus of claim 19 further comprising:

subdivide the plurality of transform parameters into a plurality of groups of transform parameters;

wherein the determining of the number of levels comprises determining, for each of the plurality of groups, an associated number of levels of the plurality of quantization levels;

wherein the assigning of each of the plurality of quantization levels comprises assigning, separately for each of the plurality of groups, each of the plurality of quantization levels of the each of the plurality of groups; and wherein the assigning of each of the plurality of transform parameters comprises assigning to one of the quantization values to which one of the plurality of quantization levels associated with the group that the each of the plurality of transform parameters belongs to is assigned.

22. An article of manufacture for compressing a transform associated with a feature space, wherein the article of manufacture is a computer readable storage medium tangibly embodying computer readable program code which, when executed, causes the computer to:

obtain the transform comprising a plurality of transform parameters;

assign each of a plurality of quantization levels for the plurality of transform parameters to one of a plurality of quantization values; and assign each of the plurality of transform parameters to one of the plurality of quantization values to which one of the plurality of quantization levels is assigned.

23. The article of manufacture of claim 22, wherein the computer readable program code, when executed, further causes the computer to:

determine a number of levels of the plurality of quantization levels.

24. The article of manufacture of claim 22, wherein the computer readable program code, when executed, further causes the computer to:

subdivide the plurality of transform parameters into a plurality of groups of transform parameters;

wherein the determining of the number of levels comprises determining, for each of the plurality of groups, an associated number of levels of the plurality of quantization levels;

wherein the assigning of each of the plurality of quantization levels comprises assigning, separately for each of the plurality of groups, each of the plurality of quantization levels of the each of the plurality of groups; and wherein the assigning of each of the plurality of transform parameters comprises assigning to one of the quantization values to which one of the plurality of quantization levels associated with the group that the each of the plurality of transform parameters belongs to is assigned.

25. A method of automatic speech recognition, the method comprising:

transforming training-speech data to a transform in a feature space, the transform comprising a plurality of transform parameters;

assigning each of a plurality of quantization levels for the plurality of transform parameters to one of a plurality of quantization values; and assigning each of the plurality of transform parameters to one of the plurality of quantization values to which one of the plurality of quantization levels is assigned;

wherein one or more of the transforming of the training-speech data, the assigning of each of the plurality of quantization levels, and the assigning of each of the transform parameters are implemented as instruction code executed on a processor device.

26. The method of claim 25 further comprising:

obtaining additional speech data; and automatic recognizing speech associated with the additional speech data according to the model.

* * * * *